United States Patent Office 3,179,566
Patented Apr. 20, 1965

3,179,566
PURIFICATION OF HEPARIN
Alan A. Horner, Downsview, Ontario, and Fred R. Edwards, Etobicoke, Ontario, Canada, assignors to Canada Packers Limited, Toronto, Ontario, Canada
No Drawing. Filed May 16, 1963, Ser. No. 281,060
12 Claims. (Cl. 167—74)

This invention relates to a process for the purification of crude heparin, and in particular to the removal of colored impurities from crude heparin to provide a product which will give a substantially clear, colorless solution.

Heparin is one of a class of substances in animal tissues which are called sulfated mucopolysaccharides. This substance has the unique property of strongly inhibiting the clotting of blood. For this reason, it is used as an anticoagulant in vascular surgery, in the treatment of thrombosis and to prevent post-operative thrombosis. Heparin is found in the liver, lung and mucosal tissue which lines the small intestine of animals. It may be isolated by any of a number of known procedures. Several of these are described in the patent literature, for example, U.S. Patents 2,884,358 and 2,954,321. Crude heparin, now available by known methods and usually in the form of the sodium salt, may have an activity of, for example, 80–100 international units per milligram (I.U./mg., as measured by the standard test system given by the U.S. Pharmacopia). Such crude heparin, however, is almost invariably characterized by a color which may range from brown to yellow. Many attempts have been made to eliminate this coloration so as to obtain a substantially pure white product which will yield a colorless solution.

A number of oxidizing agents have been proposed for bleaching the crude heparin. Since the action of oxidizing agents is very vigorous, there is always the danger that they will attack not only the colored impurities, but the heparin itself. The use of oxidizing agents, therefore, must be closely controlled.

A recent U.S. Patent, No. 2,830,931, describes the use of permanganates for the removal of colored impurities from heparin. This patent discloses that the heparin may be bleached by heating it in aqueous medium with the permanganate to a temperature within the range of 60° to 90° C., and that the pH must be controlled very carefully in the range of 8.0 to 8.5. Canadian Patent 624,095 also discloses the use of permanganates as bleaching agents, and in addition, suggests that bromates, perborates, persulfates, hypochlorites, chlorates, dichromates, chromates, iodates, hypoiodites, periodates and hypobromites can be used, as well as the halogens, chlorine, bromine and iodine. The preferred permanganate reagent may be used in excess, at room temperature, but the excess must be subsequently removed with a mild reducing agent such as formaldehyde.

The present invention has for its general object, the preparation of purified heparin from crude heparin material.

Another object of the invention is to provide a procedure for the successful removal of colored impurities from crude heparin by the use of hydrogen peroxide.

A further object of the invention is to provide a relatively simple process for preparing, from crude heparin, a substantially colorless product having increased specific heparin activity.

The process of the invention in its broad aspects comprises the purification of crude heparin by raising the pH of an aqueous solution of said crude heparin by the addition of a strong base until said solution becomes sufficiently alkaline to cause a precipitate of impurities to form, removing the precipitated impurities from the solution, adding hydrogen peroxide to the alkaline solution in sufficient quantity to bleach the colored impurities of the heparin, maintaining the pH of the resulting solution on the alkaline side during bleaching, preferably by initially adjusting the pH to about 8.5 to 9.5, i.e., approximately pH 9, after hydrogen peroxide addition, permitting the solution to stand until the bleaching operation is complete and then recovering the heparin from the solution.

It has been found that crude heparin may be satisfactorily purified by this procedure, and that even at room temperature or lower, the bleaching action of hydrogen peroxide is reasonably rapid and complete. There is no loss of heparin activity and the volume of the hydrogen peroxide does not have to be strictly controlled.

The control of pH is an important feature in the process. This is accomplished through the use of a strong base such as the alkaline metal hydroxides, e.g., NaOH and KOH. It has been found that if an aqueous solution of crude heparin, which usually has a pH of about 8, is adjusted to a pH of approximately 11 or higher with sodium hydroxide or other strong base, a flocculant precipitate forms, and is readily removable by settling or filtration. The exact pH at which this precipitate will form is dependent to some extent upon the concentration of the heparin solution. Solutions of lower concentration require higher pH values, i.e., the pH is more critical at lower concentration. With a heparin solution of 1% concentration, it may be desirable to raise the pH to 12.5 or higher. On the other hand, heparin solutions of 5% concentrations have, in some instances, formed a satisfactory precipitate as low as pH 10. The exact pH to be used for a particular heparin solution can best be determined by the operator, guided by the knowledge that a precipitate should be formed within the general range of about pH 11 to 13 for heparin solutions of a concentration of 1% or higher. It is preferred that the heparin solution to which the strong base is added have a heparin concentration of about 2–10% with 5% being regarded as ideal.

The exact nature of this precipitated material is not known, but it contains substantially no heparin activity, and so must be regarded as an undesirable diluent. It has been found to be important to remove the precipitated material from the solution before adding the hydrogen peroxide. If it is not removed, bleaching is in general, less successful. Also, the final heparin product will have a lower activity, being diluted with the inert material.

After the hydrogen peroxide has been added to the alkaline heparin solution, there is usually a drop in pH due to the acidic nature of this reagent. Thus, the pH value of the heparin solution may drop from pH 11 or higher to less than pH 9. It has further been found to be an important feature of the invention that the pH at the beginning of the bleaching period be approximately 8.5 to 9.5, preferably pH 9. The pH can be adjusted by addition of sodium hydroxide where the pH falls below the desired value upon addition of hydrogen peroxide. Bleaching of the heparin solution with hydrogen peroxide will occur under more alkaline or under more acid conditions. However, the pH tends to fall during the bleaching period and heparin may be inactivated at acid pH by reason of removal of some of its sulfate groups. The adjustment of the pH within the given range at the beginning of the bleaching period is a safeguard against dropping into the acid range. Alternatively, the pH may be adjusted from time to time during the bleaching period to ensure alkaline conditions. At pH values above 9.5 bleaching with hydrogen peroxide appears to be less rapid and complete. Therefore, it is desirable that pH be maintained above 7.0 and below 9.5 throughout the bleaching stage.

After the hydrogen peroxide has been added to the solution of crude heparin and the pH has been adjusted to approximately 9.0, the resulting solution may be left to stand at room temperature overnight to complete the bleaching action. Bleaching at this temperature is substantially complete within 12–24 hours. The time, however, is not sharply critical and may be reduced by an increase in temperature and is increased at temperatures below room temperature. Thus, the temperature of the solution may be raised to, for example, approximately 50° C. and bleaching completed in a few hours without substantial effect upon heparin activity. Temperatures within the range of 0 to 60° C., in general, would appear operable, but the milder temperatures within this range are preferred.

The concentration of the hydrogen peroxide is not sharply critical, and it has been found that satisfactory results are obtained when about 5% to 25% by volume, based on the heparin solution, of 30% hydrogen peroxide solution is added to a heparin solution of 5% concentration with approximately 10% being optimum. The amount of hydrogen peroxide solution can readily be adjusted to provide the necessary bleaching action for the particular batch and solution concentration of heparin being treated. Excess $H_2O_2$ does not appear to be detrimental.

It has also been found that crude heparin may contain appreciable quantities of nucleic acids. Nucleic acids are readily detected by their characteristic absorption of ultra-violet light of a specific wave length. It is preferred that the nucleic acid content of the heparin be kept at a low value although these substances do not materially effect the therapeutic value of the heparin. Accordingly, another feature of the present invention comprises reduction of the nucleic acid content of the crude heparin. Preferably, this is accomplished prior to the bleaching stage, but can also be done after bleaching is completed.

Nucleic acids are insoluble at low pH values, but acid conditions tend to destroy the heparin. Various adsorbents such as certain grades of activated charcoals and natural and activated clays, e.g., fuller's earth and bentonite, will adsorb nucleic acids, but each of these adsorbents has associated problems. Thus, activated charcoals may also adsorb some of the heparin and the clay adsorbents have low capacity and poor filtering qualities.

It has now been found that a synthetic hydrated magnesium silicate has excellent adsorptive capacity for the nucleic acids and, additionally, has good filtering qualities. One such hydrated magnesium silicate adsorbent is commercially available under the name of "Celkate," manufactured by the Johns-Manville Company, Celite Division, New York, N.Y. Therefore, in the preferred procedure of the present invention, solutions of crude heparin and in particular, those which are determined by analysis to have high nucleic acid content are treated with the synthetic hydrated magnesium silicate adsorbent before they are bleached with hydrogen peroxide.

It is known that the activity of crude heparin may be raised by solvent fractionation. This can be accomplished by dissolving the bleached heparin in salt solution, and adding acetone to approximately 40% concentration by volume. At this concentration, heparin of high activity precipitates. This is removed and the acetone concentration of the remaining solution is then raised to approximately 60%, at which concentration a heparin fraction of lesser activity precipitates. In instances in which the bleached heparin is of 80–100 I.U./mg. activity, the activity of the first acetone precipitated fraction may be in the order of 150–170 I.U./mg. Accordingly in order to obtain a substantially pure heparin product of high activity, the process of the invention includes removal of nucleic acids from the heparin by treatment with a magnesium silicate adsorbent, adjustment of the pH of an aqueous solution of the heparin to a pH in the range of about pH 11 to 13 by addition of sodium hydroxide, removal of the precipitate formed at this pH, addition of hydrogen peroxide to the alkaline solution of heparin and bleaching of said solution with the added hydrogen peroxide at a pH in the range of approximately 7.0 to 9.5, recovery of the heparin from such solution, and solvent fractionation of the bleached heparin to provide a fraction of high specific heparin activity.

EXAMPLE 1

*Removal of insoluble material from crude heparin at high pH*

Three solutions of crude heparin were made with concentrations of 1 g. percent, 2.5 g. percent and 5 g. percent, respectively. Two samples of each of the three solutions were adjusted to pH 11.5 and pH 12.5 by adding 5 N NaOH. In all samples at pH 11.5 a haziness developed. In all samples at pH 12.5 a flocculent precipitate formed and settled in 15–30 minutes.

All six samples were centrifuged in tared tubes until the supernatants were clear. The precipitates were washed with dilute NaOH, of the same pH as that at which they precipitated, recentrifuged, and the precipitates vacuum-dried at 50° C. until they reached constant weight after 4 days.

The results are tabulated below:

| Concentration of crude heparin | pH | Percent by wt. of the crude which was precipitated |
|---|---|---|
| 1 g. percent | 11.5 | 1.0 |
| 2.5 g. percent | 11.5 | 0.6 |
| 5.0 g. percent | 11.5 | 3.3 |
| 1 g. percent | 12.5 | 3.1 |
| 2.5 g. percent | 12.5 | 3.2 |
| 5.0 g. percent | 12.5 | 3.9 |

These data show that the best pH for the precipitation of alkali-insoluble impurities over the entire concentration range in this crude heparin was 12.5. At 5.0 g. percent concentration the amount of impurities precipitated at pH 11.5 was slightly lower than at pH 12.5, but at the lower concentrations the amounts of impurities precipitated at the lower pH were considerably less.

EXAMPLE 2

*The effect of pH on bleaching with hydrogen peroxide*

Crude heparin was precipitated from 60% acetone. The precipitate was dried and dissolved in water to give a 5% solution, pH 7.6. The color value was 52, as measured in a Klett colorimeter with a Blue filter. (Klett-Summerson Photoelectric Colorimeter made by Klett Manufacturing Company, New York, N.Y.) Solid NaOH was dissolved in this solution to give a pH of 12.4. After filtering, ⅕ volume of 30% $H_2O_2$ was added. The pH fell to 8.65; the Klett value was 41.

Four portions of the solution at room temperature were adjusted to pH 8.0, 9.0, 10.0 and 10.9, the remainder was left at pH 8.65. In the following table, these are designated as A, B, C, D and E in order of pH. Klett values were determined at intervals.

| Time | A | | B | | C | | D | | E | |
|---|---|---|---|---|---|---|---|---|---|---|
| | pH | Klett | pH | Klett | pH | Klett | pH | Klett | pH | Klett |
| Zero | 8.0 | 41 | 8.65 | 41 | 9.0 | 41 | 10.0 | 41 | 10.9 | 41 |
| 17 hours | 6.7 | 4 | 8.0 | 5 | 9.0 | 4 | 11.0 | 11 | 11.2 | 14 |
| 24 hours | 6.2 | 0 | 7.6 | 0 | 8.9 | 0 | 11.0 | 7 | 11.1 | 10 |

Bleaching was equally efficient at room temperature when the initial pH was 8.0, 8.65 or 9.0. The pH of solution A, initially 8.0 dropped into the acid range during the bleaching period. Heparin may be desulfated at acidic pH. Therefore, an initial pH of about 9.0 after adding $H_2O_2$ is preferred, as pH does not fall appreciably in this case.

EXAMPLE 3

*Bleaching of crude heparin with varying concentrations of hydrogen peroxide*

A 5% solution of crude heparin was adjusted to pH 12.3 by adding solid NaOH. After filtering to remove the precipitated impurities, the solution was divided into four parts, to which amounts of 30% $H_2O_2$ ranging from 5% to 20% by volume were added. Bleaching was conducted at room temperature. Where necessary, pH was adjusted to the range 8.8 to 9.2.

Klett colorimeter readings were taken at intervals, using a Blue filter. pH readings and adjustments were made as shown in the following table:

| Time | | Volume of 30% $H_2O_2$ added | | | | | | | |
|---|---|---|---|---|---|---|---|---|---|
| | | 5% | | 10% | | 15% | | 20% | |
| | | pH | Klett | pH | Klett | pH | Klett | pH | Klett |
| Zero | pH when $H_2O_2$ added | 9.1 | 24 | 8.8 | 24 | 8.7 | 22 | 8.5 | 22 |
| | Adjusted to | | | | | 9.1 | | 9.2 | |
| 18 hrs | | | 12 | | 12 | | 12 | | 14 |
| 24 hrs | pH adjusted to | 7.4 | | 6.7 | | 8.8 | | 9.2 | |
| | | 8.8 | | 8.8 | | | | | |
| 43 hrs | | 7.4 | 8 | 6.6 | 6 | 8.7 | 9 | 9.0 | 12 |

Bleaching was most effective on the 5% heparin solution with 10% by volume of 30% $H_2O_2$.

EXAMPLE 4

*Bleaching of a 5% solution of crude heparin at 50° C.*

A solution of crude heparin (concentration 5 g. percent; activity 120 I.U./mg.) was adjusted to pH 12.5 by adding 5 N NaOH. Material which flocculated and settled out of solution was removed by filtering with Celite. The Klett (Blue) value was 97. ⅒ volume of 30% $H_2O_2$ was added and the pH, which fell to 8.8, was adjusted to 9.0 with NaOH. The solution was immediately placed in a water bath at 50° C. and the pH checked every hour. pH fell at a rate of approximately 0.4 pH/hour, and was readjusted to pH 9.0 every hour. After 5 hours, the Klett (Blue) value was 5 and half the solution was taken from the bath. Heparin was precipitated with 60% acetone by standard procedures.

The product of the 5 hour bleach had an activity of 125 I.U./mg. It passed the color test and the color stability test.

The other half of the solution was kept at 50° C. overnight (16 hours). The pH fell to 6.2 and the Klett (Blue) value was zero. The heparin recovered by precipitation with 60% acetone had an activity of 82 I.U./mg.

Thus a 5 g. percent solution of crude heparin may be bleached with $H_2O_2$ at 50° C. if due care is taken to adjust the pH. In practice overnight bleaching at room temperature is more convenient, because no pH adjustments are necessary after the initial adjustment to pH of about 9.0.

EXAMPLE 5

*Bleaching of a 1% solution of crude heparin at 50° C.*

A solution of crude heparin (concentration 5 g. percent; activity 120 I.U./mg.) was adjusted to pH 12.5 and insoluble material removed, exactly as in the previous example.

The clear filtrate was diluted with 4 volumes of water. The Klett (Blue) value was 20. To this solution ½₅ volume of 30% $H_2O_2$ was added and the pH adjusted to 9.0. The solution was kept at 50° C. for five hours and the pH adjusted to 9.0 every hour. The average fall in pH was about 0.1 units/hour. After five hours the Klett (Blue) value was 2. Heparin was precipitated with 60% acetone and dried in the usual way. The final product had an anticoagulant activity of 127 I.U./mg.; it passed the color test and color-stability test.

EXAMPLE 6

*Bleaching at 3.5° C.*

Two thousand and fifty grams of crude hog heparin were dissolved in 40 litres of distilled water and the pH adjusted to 11.5 with 50% sodium hydroxide. The resulting precipitate was removed by filtration and 4 litres of 30% hydrogen peroxide were added to the clear solution. The pH was adjusted to 9.1 with 50% sodium hydroxide and held at 3.5° C. for 21.5 hours. During the bleaching process the pH was maintained between 8.9 and 9.1. The bleached solution was well agitated to remove dissolved gases, and 200 gms. of sodium chloride were added. The bleached heparin was recovered by solvent precipitation in the usual manner.

EXAMPLE 7

Crude heparin was dissolved in distilled water to make approximately a 5% solution (470 grams of crude heparin was dissolved in 9 litres of distilled water). The pH of this solution was then adjusted with 50% sodium hydroxide to pH 10. A precipitate formed at this pH and was removed by filtration. To the filtered solution, 2.2 litres of 35% hydrogen peroxide was added and intimately mixed. The pH of the resulting solution was checked and adjusted to 9.5 with 50% aqueous sodium hydroxide. The resulting solution was held at 78° F. for 105 hours. When the bleaching operation was complete, 165 grams of sodium chloride were added and the solution vigorously agitated to remove dissolved gas. The solution was then filtered and the pH adjusted to 7.3 with dilute hydrochloric acid. The bleached heparin was precipitated in the usual manner, filtered and vacuum dried.

EXAMPLE 8

Crude hog heparin was dissolved in distilled water (36 litres distilled water and 1918 grams crude heparin). The pH of the solution was adjusted to 11.3 with 50% sodium hydroxide solution and the solution was filtered to remove the precipitate which formed. To this solution was added 7.2 litres of 35% hydrogen peroxide. After thorough mixing, the pH of the solution was adjusted to 9.0 with 50% sodium hydroxide. The resulting solution was held at 68° F. for 44 hours. After the bleaching operations, 450 grams of sodium chloride were added and the solution vigorously agitated to remove dissolved gas. The solution was then filtered and the pH adjusted to 7.3 with dilute hydrochloric acid. The bleached heparin was then precipitated, filtered and vacuum dried.

EXAMPLE 9

Two kilos of crude hog heparin were dissolved in 45 litres of distilled water and the pH of the solution was increased to 11.4 by adding 50% sodium hydroxide solution. The solution was filtered to remove the precipitate.

To the filtered solution were added nine litres of 35% hydrogen peroxide, the solution was well agitated and the pH adjusted to 9 with 50% sodium hydroxide. After standing at 72° F. for 19½ hours, the dissolved gases were removed by violent agitation. The solution was made 1% with sodium chloride, the pH was adjusted to 7.2 with dilute hydrochloric acid and the bleached heparin was precipitated, filtered and vacuum dried.

EXAMPLE 10

Crude dried beef heparin was dissolved in distilled water (122 grams dissolved in 2.2 litres of distilled water). The pH of the solution was adjusted to 11.4 with 50% sodium hydroxide and the solution was filtered to remove the precipitate. To this solution was added 440 ml. of 35% hydrogen peroxide which was mixed well and the pH adjusted to 9.1 with 50% sodium hydroxide. This resulting solution was held at 72° F. for 18½ hours. Twenty-six grams of salt were added to the bleached solution and violently agitated until most of the dissolved gases were liberated. The solution was then filtered and the pH adjusted to 7.3 with dilute hydrochloric acid. The bleached heparin was then precipitated, filtered and vacuum dried.

EXAMPLE 11

Crude beef heparin was dissolved in distilled water (1,564 grams heparin dissolved in 31 litres of water). The pH of the solution was raised to 11.3 with 50% sodium hydroxide, and the resulting solution filtered. To this solution was added 6.5 litres of 35% hydrogen peroxide. This solution was well agitated and the pH adjusted to 9.0 with 50% sodium hydroxide. The resulting solution was held at 70° F. for 25½ hours. The bleached solution was then agitated violently to remove dissolved gases and 375 grams of salt were added. The bleached solution was then filtered, the pH was adjusted to 7.3 with dilute hydrochloric acid and the heparin was then precipitated, filtered and vacuum dried.

EXAMPLE 12

A 5% solution of crude heparin (activity 86 units/mg. dry wt.) had a pH of 9.5. This was raised to 12.5 with 5 N NaOH. A flocculent precipitate formed as usual. Filtering gave a clear yellow solution, Klett value=106 (Blue filter). ⅓ volume of 30% $H_2O_2$ was added. The pH fell to 8.9 and was adjusted to 9.0. After standing for 24 hours at room temperature (22 to 26° C.) the Klett value was 13. The bleached heparin was precipitated with 60% acetone under standard conditions (pH 6.7:1% NaCl added). The dried precipitate was redissolved to give a 5% solution, pH 7.2, Klett value 11. The heparin was reprecipitated with 50% acetone, dried and assayed.

*Analyses of product.*—Anticoagulant activity: 112 units/mg. Color value: Passed test.

EXAMPLE 13

*Removal of nucleic acids from crude heparin*

Small samples of a 5% solution of a crude heparin were shaken overnight with amounts of synthetic hydrated magnesium silicate (Celkate) varying from 5% to 25% (w./v.). Each sample was then centrifuged and the clear supernatants were diluted with water and their extinction coefficients at 255 mμ measured in an ultraviolet spectrophotometer.

| Concentration of adsorbent (w./v.), percent: | $E_{1\,cm}^{1\%}$ at 255 mμ |
|---|---|
| Zero | 55.0 |
| 5 | 45.3 |
| 10 | 13.6 |
| 15 | 2.6 |
| 20 | 0.6 |
| 25 | 0.9 |

An assay of anticoagulant activity showed that there was no change in heparin concentration during treatment with this adsorbent. Solutions so treated, preferably with at least 10% w./v. of the adsorbent, are then further treated as in the preceding examples.

EXAMPLE 14

*Removal of nucleic acids from bleached, fractionated heparin*

A sample of crude heparin was bleached with $H_2O_2$ and precipitated with 40% acetone. The product had an $$E_{1\,cm}^{1\%} \text{ at } 255 \text{ m}\mu = 3.000$$

A 5% solution of this material was shaken overnight with synthetic magnesium silicate (Celkate, 10% w./v.). This lowered the $$E_{1\,cm}^{1\%} \text{ at } 255 \text{ m}\mu \text{ to } 0.376$$

The 40% acetone precipitate from this solution had an $$E_{1\,cm}^{1\%} \text{ at } 255 \text{ m}\mu = 0.326$$

From the foregoing it will be seen that impurities (up to 3 or 4% by weight based on the weight of the crude material) can be precipitated from solutions of crude heparin by raising the pH of the solution to at least pH 10 and preferably within the range of about 11 to 13 by addition of a strong base, and that the heparin solutions thus treated can be bleached with hydrogen peroxide under alkaline conditions at temperatures within the range of 0° to 60° C., without substantial loss of anticoagulant activity, giving products of acceptable color and color stability. It will also be seen that further improvements in purity can be readily accomplished by nucleic acid removal with magnesium silicate.

It will be understood that the word "heparin" as used in the specification and claims is inclusive of salts of heparin, i.e., the normal form of heparin. The bleaching process of the examples is on the sodium salt form.

We claim:

1. A process for the purification of crude heparin which contains a substantial quantity of impurities, comprising: raising the pH of an aqueous solution containing from about 1 to 10% by weight of said crude heparin by the addition of a strong base until the solution has reached an alkalinity of at least about pH 10 and a precipitate has formed, removing said precipitate from the alkaline solution, adding hydrogen peroxide to the resulting alkaline solution, bleaching said heparin solution with the added hydrogen peroxide while maintaining alkaline conditions during said bleaching and recovering the heparin from such solution.

2. The process of claim 1 wherein the pH of the solution is raised to approximately pH 12.5.

3. The process as defined in claim 1 wherein the concentration of the aqueous solution of crude heparin is about 5% and the quantity of hydrogen peroxide added to said solution after removal of the precipitate is equivalent to approximately 5 to 25% by volume, based on the heparin solution, of a 30% solution of hydrogen peroxide.

4. The process of claim 1 wherein the heparin is bleached at a temperature in the range of 0° to 60° C.

5. The process of claim 1 including the step of removal of nucleic acids from the heparin by treatment of the alkaline solution with hydrated magnesium silicate.

6. The process of claim 1 wherein after the hydrogen peroxide addition a further quantity of strong base is added to maintain alkaline conditions during bleaching.

7. A process for the purification of crude heparin containing a substantial quantity of colored impurities, comprising: preparing an aqueous solution of said crude heparin of at least about 1% concentration, adjusting the pH of said aqueous solution to a pH of about 11 to 13 by the addition of sodium hydroxide to cause a precipitate to form, removing the precipitate from the solution, adding hydrogen peroxide to the alkaline solution in sufficient quantity to bleach the colored impurities of the heparin, adjusting the pH of the resulting solution to a value within the range of about pH 8.5 to 9.5, bleaching said heparin solution with the added hydrogen peroxide while maintaining alkaline conditions and then recovering heparin from said solution.

8. The process as defined in claim 7 wherein the heparin solution, after addition of the hydrogen peroxide and pH adjustment to pH 8.5 to 9.5, is permitted to stand at approximately room temperature until the bleaching operation is complete.

9. The process as defined in claim 8 wherein the pH of the heparin solution, after hydrogen peroxide addition, is adjusted to about 9.0.

10. A process for the purification of heparin containing nucleic acids and colored impurities, comprising: preparing an aqueous solution of said heparin of at least about 1% concentration, treating said aqueous solution of heparin with hydrated magnesium silicate adsorbent to reduce the nucleic acid content, adjusting the pH of the resulting solution of heparin to about pH 11 to 13 by the addition of sodium hydroxide, removing the precipitate formed at this pH, adding hydrogen peroxide to the resulting alkaline solution of heparin, bleaching said solution with the added hydrogen peroxide at a pH in the range of approximately 7.0 to 9.5 and recovering the heparin from the resulting solution.

11. A process for the preparation of a substantially pure heparin product of high heparin activity from crude heparin containing a substantial quantity of impurities, comprising: preparing an aqueous solution of said crude heparin of a concentration of at least about 1%, adjusting the pH of said aqueous solution of heparin to about pH 11 to 13 by the addition of sodium hydroxide, removing the precipitate formed at this pH, adding hydrogen peroxide to the resulting alkaline heparin solution and adjusting the pH of such solution to approximately pH 9, permitting the solution to stand at room temperature after addition of hydrogen peroxide until bleaching action is substantially complete, recovering the heparin from said solution, and precipitating a highly active fraction of said heparin from a salt solution thereof by addition of an organic solvent.

12. A process for the preparation of a relatively pure heparin product from crude heparin containing a substantial quantity of impurities, comprising: preparing an aqueous solution of said crude heparin of at least about 1% concentration, treating said aqueous solution with hydrated magnesium silicate adsorbent to remove nucleic acids, adjusting the pH of the resulting aqueous solution of heparin to a pH of about 11 to 13 by the addition of sodium hydroxide, removing the precipitate formed at this pH, adding hydrogen peroxide to the resulting solution and bleaching the colored impurities of said solution at pH between 7.0 and 9.5, recovering the heparin from the bleached solution, dissolving the recovered heparin in an aqueous salt solution and reprecipitating it from said salt solution by the addition of acetone.

References Cited by the Examiner

Scott: J. Biol. Chem., vol. 102, 1933, pages 437 and 441.

LEWIS GOTTS, *Primary Examiner.*

FRANK CACCIAPAGLIA, JR., *Examiner.*